United States Patent
Dubnow

(10) Patent No.: US 8,237,704 B1
(45) Date of Patent: Aug. 7, 2012

(54) METHOD OF MANUFACTURING A THREE-DIMENSIONAL VIEWING DISK

(76) Inventor: Richard Dubnow, Beavercreek, OR (US)

( * ) Notice: Subject to any disclaimer, the term of this patent is extended or adjusted under 35 U.S.C. 154(b) by 417 days.

(21) Appl. No.: 12/633,902

(22) Filed: Dec. 9, 2009

Related U.S. Application Data

(60) Provisional application No. 61/122,853, filed on Dec. 16, 2008.

(51) Int. Cl.
*G95T 15/00* (2006.01)

(52) U.S. Cl. ............. 345/419; 345/7; 345/42; 705/26.5; 355/77

(58) Field of Classification Search .................. 345/419, 345/7, 42; 705/26.5, 27.1; 355/77
See application file for complete search history.

(56) References Cited

U.S. PATENT DOCUMENTS

| | | | |
|---|---|---|---|
| 4,040,071 A | 8/1977 | Shane | |
| 6,295,067 B1* | 9/2001 | Dubnow | 345/419 |
| 7,274,816 B2* | 9/2007 | Yoshida | 382/154 |
| 7,349,568 B2* | 3/2008 | Takemoto et al. | 382/154 |
| 7,606,733 B2* | 10/2009 | Shmueli et al. | 705/26.35 |
| 2006/0023197 A1* | 2/2006 | Joel | 355/77 |
| 2007/0005482 A1* | 1/2007 | Graham | 705/37 |
| 2007/0145734 A1* | 6/2007 | Wen et al. | 283/67 |
| 2008/0226281 A1 | 9/2008 | Lipton | |
| 2008/0273081 A1 | 11/2008 | Lipton | |
| 2009/0315670 A1* | 12/2009 | Naressi et al. | 340/5.8 |

\* cited by examiner

*Primary Examiner* — Mark Fadok
(74) *Attorney, Agent, or Firm* — Bert P. Krages, II

(57) ABSTRACT

A method of manufacturing a three-dimensional viewing disk of the type that can viewed using a stereoscopic viewing device, such as the devices sold under the trademark VIEW-MASTER. The method enables the manufacturing of disks in small lots using conventional two-dimensional digital images with the addition of text that is viewed with a three-dimensional effect.

16 Claims, 3 Drawing Sheets

METHOD OF MANUFACTURING A THREE-DIMENSIONAL VIEWING DISK

CROSS REFERENCE TO RELATED APPLICATIONS

This application claims the benefit to the prior provisional patent application 61/122,853 filed Dec. 16, 2008, the filing date of which is hereby claimed and which application is hereby adopted by reference as part of the present disclosure.

FIELD OF THE INVENTION

This invention relates to a method of manufacturing a three-dimensional viewing disk of the type that can viewed using a stereoscopic viewing device, such as the devices sold under the trademark VIEW-MASTER.

BACKGROUND OF THE INVENTION

For many decades, viewing disks of the type that can be viewed by stereoscopic viewing devices have been very popular. This type of disk is made of stiff opaque sheet material and is formed with 14 substantially-rectangular apertures which are equiangularly spaced about, and are equidistant from, the center of the disk. The disk encompasses seven pairs of transparencies, representing left and right stereoscopic images respectively of seven scenes. The stereoscopic viewing device has two eyepieces for viewing simultaneously, with both eyes respectively, one pair of transparencies so that the user can view a three-dimensional image. The viewing device includes an advancing mechanism which engages indexing holes in the disk for rotating the disk to seven indexed positions allowing the user to view three-dimensional images of the seven scenes in succession.

In the traditional method of mass manufacturing a three-dimensional viewing disk, a stereo camera is used to capture left eye and right eye images of a scene on photographic transparency film. The transparency film is then used to generate corresponding internegatives and the two internegatives of one pair are mounted on a carrier in carefully controlled relative positions and orientations. The carrier is placed in an optical printer which makes multiple copies of the left eye image and multiple copies of the right eye image on respective rolls of receiving film. The carrier serves to position the internegatives precisely relative to the frame of the receiving film, and accordingly the images are located with a high degree of precision relative to the frame of the receiving film. The rolls of receiving film are die cut into individual transparencies and the left and right eye transparencies for a given scene are attached to a first of the two cards using registration elements to ensure that the two die cut transparencies are in the proper relative positions and orientations. The left and right eye transparencies for the next scene are then attached to the first card, and so on until all seven pairs of transparencies have been attached to the first card. Finally, the second card is attached to the first card and the 14 transparencies are then held securely between the cards.

The traditional method of fabricating a three-dimensional viewing disk requires complex machinery which must be maintained and adjusted to ensure that the die-cut transparencies will be properly positioned in the completed disk. The cost per disk of manufacturing a long run of disks is very low, but the nature of the manufacturing process makes it expensive to manufacture a short run of disks. Further, the lead time required to obtain a short run of disks is long. Therefore, this method of manufacturing is not economically feasible for short runs of disks such as those in the range of 1 to 150 disks.

A more practical approach to manufacturing short runs of three-dimensional viewing disks uses computer technology, rather than mechanical technology, to position the images within a template for a disk. The method allows a short run of viewing disks to be manufactured at a substantially lower cost per disk than the conventional method of manufacturing three-dimensional viewing disks. Such a method makes the process practicable for customized viewing disks that are suitable for uses such as promotional activities for businesses.

One method, which is described in U.S. Pat. No. 6,295,067, comprises creating first and second image data files representing the left and right stereoscopic images respectively of the selected scene, employing the first and second image data files to create a stereo image data file representing the left and right stereoscopic images in predetermined relative positions, and employing the stereo image data file to create a transparency image incorporating the left and right stereoscopic images. The left and right stereoscopic images of the selected seven scenes are placed in appropriate relative orientations and positions in a graphics plane using graphic arts software such as Adobe Photoshop and Adobe Illustrator to create digital image files that are printed onto a master transparency film using a film recorder. Duplicate transparencies are created by a contact printing process, laminated with transparent laminate material, and then punched to create the three-dimensional viewing disks. Although this method is commercially viable for manufacturing short runs of disks, it does require a human operator to position the image files within templates and make adjustments to the relative positions of images to achieve the desired stereoscopic effect. As such, the method is not particularly suitable for Internet-based businesses that are directed towards consumers as opposed to businesses. Thus there is a need for a method of manufacturing three-dimensional viewing disks that avoids the necessity of human-directed processing of the images with graphic arts software.

SUMMARY OF THE INVENTION

The present invention provides a method of manufacturing three-dimensional viewing disks that allows for direct production of a master print file with seven images with three-dimensional text to make up disks with images that have a three-dimensional look when viewed through a stereoscopic viewing device of type sold under the trademark VIEW-MASTER. The images themselves are not stereoscopic. Instead, conventional two-dimensional digital images are stored into the memory of a computer where, if desired, software can be utilized to enable the resizing, adjustment of color and density, rotation, and cropping of the images. The software also allows for the insertion of a caption or text that the software manipulates and embeds into the image so that the text appears three-dimensional when viewed through a viewer. Images may be stored into computer memory and processed one at a time until a collection of seven images is configured in conformance with a reel. The software can also place artwork, bar coding, and text within the center portion of the reel. Once the processing by the software is completed, the results are saved as a reel image file that is stored into computer memory. The process is fully automated and requires no human intervention other than the loading and adjusting the images, entering the text for the images, and selecting and modifying the artwork and text placed in the center portion of the reel.

A digital master print file is created by compositing reel image files in an array of five by seven files. The digital master print file can contain anywhere between 1 to 35 copies of an individual reel image file depending on the size of the desired run. For example, a particular digital master file could consist of 5 copies of a first reel image file, ten copies of a second reel image file, and twenty copies of a third reel image file. The master print file is then automatically transferred from the computer to a film recorder where a sheet of photographic transparency film with dimensions of 20 inches by 31 inches is exposed by a three laser beam source of red, green and blue lasers that are combined into a fiber optic and shined onto a rotating mirror. The laser light is exposed onto the film such that the sheet is populated with images of 35 individual reels. Once the film is complete with exposure, the film is automatically processed through an RA4 film processor. After processing, the sheet of film is laminated on both sides in optically clear, heat activated laminate which adds rigidity and strength to the sheet. The sheet of film is then die cut with a laser light alignment system that punches out the 35 reels which are then transported by a belt to a tube where the disks are collected in a ordered fashion. Other means of cutting could be used such as laser cutting and rotary cutting.

The invention is well suited to be used in connection with an Internet-based business in which customers upload images to a server via a website. The customers are able to make adjustments to their images such as resizing and cropping and may provide captions that will be embedded into each image. With respect to the captions, customers may additionally select the location of the caption, the level of three-dimensional effect, the color of the caption, and size and typeface. They may also provide text for the center portion of the disk as well as upload artwork image files or select from a menu of website-provided artwork image files that will be placed into the center portion of the disk. Customers also provide the number of copies of each disk to be ordered, a shipping address, and the credit card information needed to effect payment. Once the customer has completed the order, the method described above is implemented to manufacture the desired number of disks. Once the finished disks are collected, a scanning device reads the bar codes at the center of the disks so that those disks can be matched with individual orders and shipped to the respective customers.

DETAILED DESCRIPTION

The invention uses a computer which runs photographic manipulation and graphics design programs to process data files representing images. In order to simplify the description, the following description refers in places to physical acts, such as moving, being performed on images. It will be understood that these references do not imply that these physical acts actually occur. These references are an abbreviated way of referring to the operation that must be performed on the data files so that these actions seem to be taken on the images that are represented by the data files.

Figure 1:
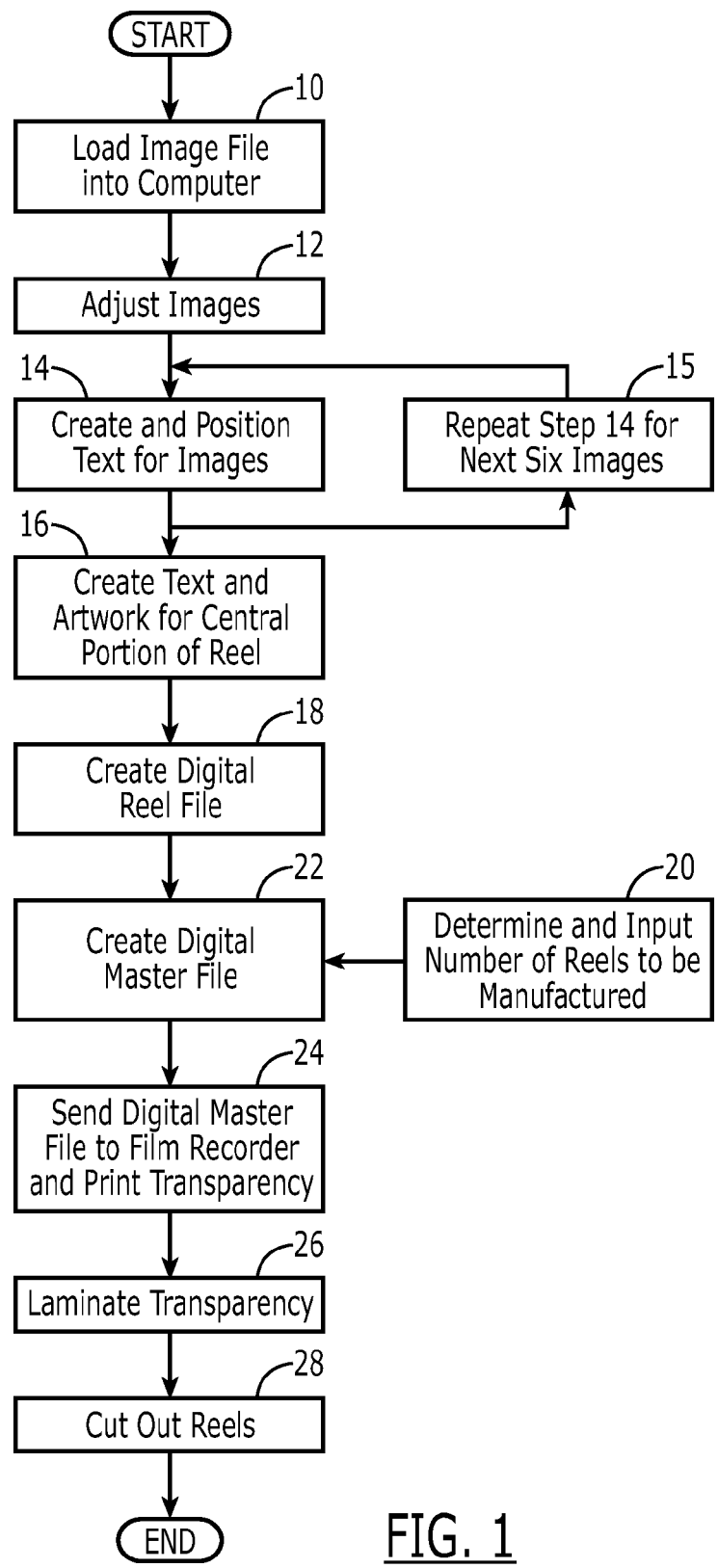
FIG. 1 is a flow chart illustrating a method of manufacturing three-dimensional viewing disks.

Referring to FIG. 1, the first step in the first method in accordance with the invention is to load an image data file into the memory of a computer (step 10). The image data file may be of any digital image format that can be processed by the photographic manipulation and graphics layout software modules residing within the computer such as JPEG, TIFF, BMP, and GIF. The image data files may be loaded into the computer by transfer over the Internet. In step 12, the image data file is opened up in an image manipulation module and various aspects of the image can be adjusted including the color, density, rotation, and sharpness of the image. In addition, the image is cropped to conform to the substantially-rectangular format of the viewing apertures in a viewing disk. Such apertures typically have an aspect ratio ranging from 0.89:1 to 1.08:1. Once the image is adjusted and cropped, the image data file is copied and the first and second identical image data files are stored into computer memory. In step 14, text for a caption is entered into the computer memory and adjusted using an image manipulation module with respect to selection of typeface, type size, color, and the desired location of the text within the image represented by the first image data file. The degree of three-dimensional effect to be imposed on the text may also be selected. In the preferred embodiment, an operator may select from one of five levels to determine the amount of three-dimensional effect that will be perceived by a person viewing the image through a stereoscopic viewer. The text is then embedded in a layer associated with the first image data file at the selected location within the image but offset horizontally in one direction by a distance that corresponds with the desired degree of three-dimensional effect. The text is also embedded in a corresponding layer in the second image data file at the same corresponding selected location but offset horizontally in the other direction by a distance that corresponds with the desired degree of three-dimensional effect. Both image files are stored into computer memory. This process is repeated (step 15) until seven pairs of image data files have been created and stored into the computer memory.

Figure 2:
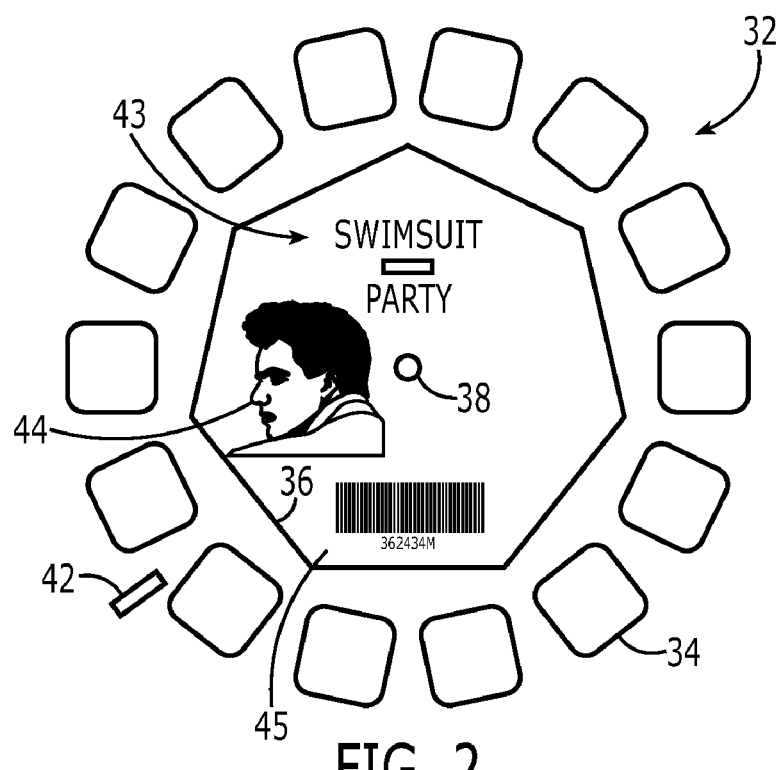
FIG. 2 illustrates a single image template.

In step 16, text and artwork are entered into computer memory and sized and otherwise adjusted by a graphics layout module to fit within a generally-hexagonal format shown in FIG. 2 as title window 36. Such text 43 may be used for various purposes including identifying the disk, stating a message, or advertisement promotion. The artwork 44 will generally consist of decorative objects. Identifying material such as bar coding 45 may also be placed within the title window 36. After the desired material been inputted and adjusted, it is saved in the form a disk label file.

In step 18 shown in FIG. 1, a digital reel file is created using a graphics layout module by opening the seven pairs of digital image files and the disk label file and locating them onto a disk template 32 of the form shown in FIG. 2. The disk template has fourteen windows 34 of which the size, position and spacing are linearly related to the size, position and spacing of the viewing apertures in the three-dimensional viewing disk. The windows 34 define the proper relative positions and orientations of each of the 14 images associated with the seven pairs of image data files. The disk template also includes a title window 36 which corresponds in size and location relative to the windows 34 to the title space on a conventional three-dimensional viewing disk. The disk template also includes a center feature 38, corresponding to the center of the viewing disk, and a feature 42 for specifying the location of at least one index hole. The images are positioned such that each is registered to fit within the appropriate window 34 so that each pair of images is aligned in a manner that one of associated images is opposite the other associated image. The disk label file is similarly opened and positioned within the title window 36. The disk template 32 is saved as a digital reel file.

Step 20, shown in FIG. 1, consists of determining the number of reels desired to be manufactured and inputting that number into computer memory. In step 22, a digital master print file is created using a graphics layout module by populating an array of five by seven files with the digital reels files until the desired number of reels are stored in the array. The array of files is then stored in computer memory as the digital master print file. The digital master print file can contain anywhere between 1 to 35 copies of an individual reel image file depending on the size of the desired run. In the event that more than 35 disks are to be manufactured, additional digital master print files are created. If less than 35 disks of a particular digital reel file are to be manufactured, the desired number of that digital reel file may be stored in a digital master print file and the balance of the array may be populated with other digital reel files.

In step 24, the digital master file is transferred to a film recorder which converts the digital master file to a viewable image that is recorded photographically on a sheet of transparency film with dimensions of 20 inches by 31 inches. In Step 26, the sheet of transparency film is removed from the film recorder and laminated between two protective sheets of transparent material such as 5 mil poly-clear laminate material. The purpose of the laminate is to augment the rigidity of the disks and to protect the film. The laminated structure is die cut using a punch press to produce thirty-five disks that can be fitted in a stereoscopic viewing device (step 28). The punch press cuts the circular perimeter of the 35 disks as well as the center holes shown as feature 38 in FIG. 2 and the index holes shown as feature 42. In the preferred embodiment, step 26 takes place as a single operation. The punch press can also incorporate a sorting device such as a conveyor belt-and-tube assembly which collects the disks and delivers them at the end of a tube in a sequential order.

Figure 3:
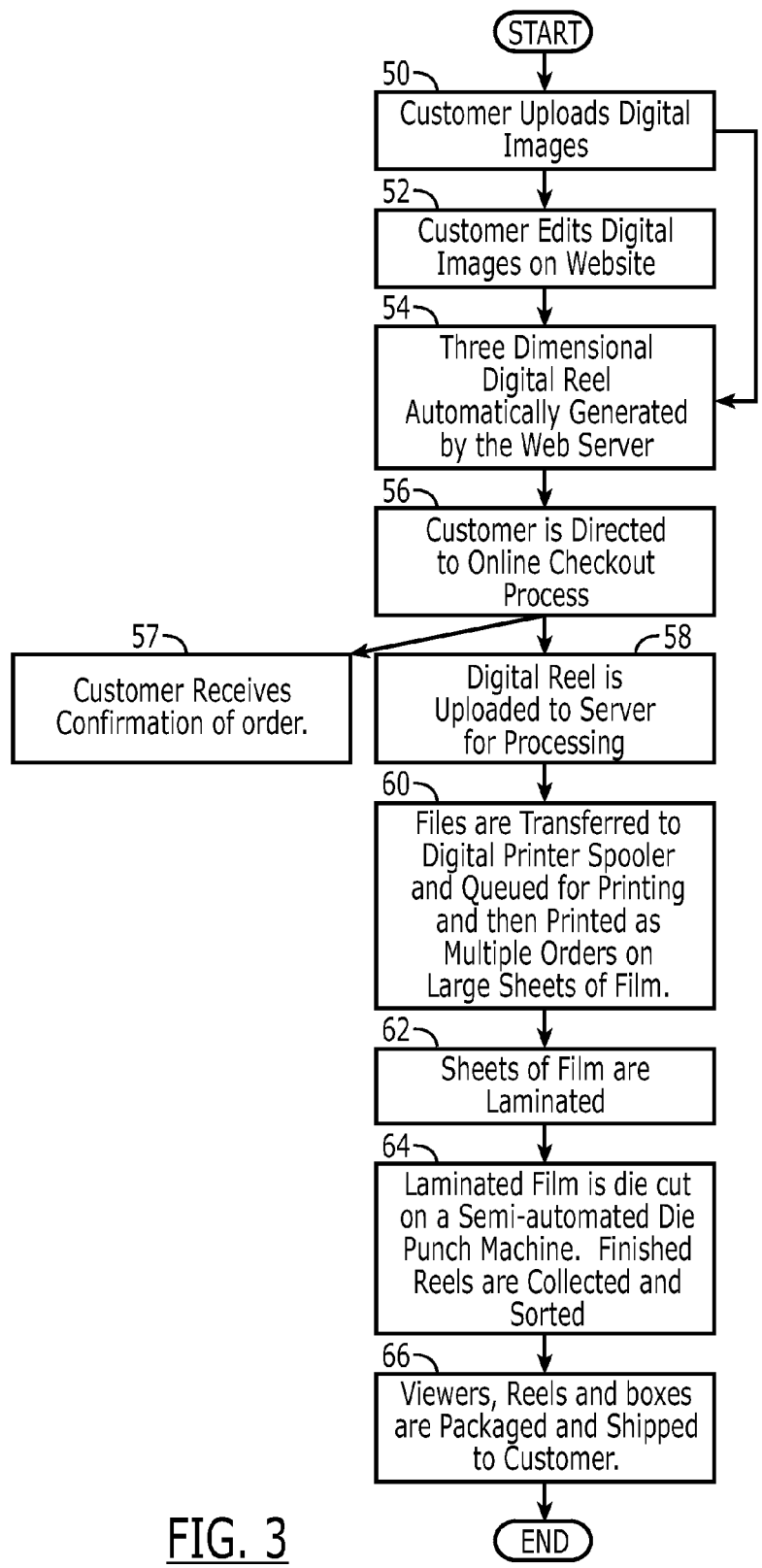
FIG. 3 is a flow chart illustrating a method of receiving and processing customer orders for a three-dimensional viewing disk.

As shown in FIG. 3, the method may be used to implement a business method of taking orders over the Internet and providing finished disks to customers. In step 50, the customer uploads a set of seven images as well as any artwork the customer may wish to have printed within the center portion of the disk. The uploading takes place through an Internet connection and the images and artwork are stored on the web server for the website operated by the business. If desired, the customer may adjust the digital images (step 52) and add caption material in the manner previously described in steps 12 and 14 shown in FIG. 1. The customer can also add artwork and a title for the disk reel as previously described in step 16 shown in FIG. 1. In step 54 shown in FIG. 3, the digital reel file is automatically generated by the web server in the manner described in step 18 shown in FIG. 1. In the event that the customer does not adjust the images, the images and artwork are automatically cropped to fit withing the respective windows in the disk template. Typically, automatic cropping will be performed by centering the image, determining the aspect ratio of the uploaded images, and cropping out the horizontal ends of the image if the aspect ratio of the uploaded image exceeds the aspect ratio of the viewing aperture and cropping out the vertical ends of the uploaded image if the aspect ratio of the uploaded image is less than the aspect ratio of the viewing aperture. For example, if the viewing apertures have aspect ratios of 1.05:1 and a horizontally-composed image taken with a digital camera with a frame having an aspect ratio of 4:3, then the images would be automatically cropped so as to delete the portions of the image at the horizontal ends if the customer did not designate the cropping adjustments. The artwork may be automatically cropped in an analogous manner. Once the digital reel file is created, a likeness of the reel is transmitted to the customer's web browser via the Internet so that the customer can evaluate it. If the customer desires, the customer can select images for additional adjustments such as rotation or cropping, Likewise, the customer may make adjustments to the text including corrections to spelling and selection of a different degree of three-dimensional effect.

In step 56, the customer is directed to an online checkout window where the customer enters information into the web server to place an order for the disks. The customers enters information such as the number the disks ordered, shipping address, and payment information. This information is stored as a customer order file in the web server. Once the information is entered and processed, the web server creates a customer order number and associated bar code image file. The bar code image file is inserted into the disk label file. Once the checkout process is completed, the customer receives a confirmation of the order via the Internet (step 57) and the digital reel file is uploaded to a server for processing (step 58). The server creates a digital master print file by populating the array described in step 22 shown in FIG. 1 in accordance with the number of disks ordered by the customer. Multiple customer orders can be consolidated by the server so that a number of digital master print files are created so as to enable the most economical printing of such disks.

In step 60, shown on FIG. 3, the digital master print files are transferred to a digital printing spooler and queued for printing on large sheets of transparency film by the film recorder. Once the sheets are printed, they are laminated between sheets of clear laminate material and cut using a punch press to release the disks (step 62). The disks are collected and sorted by customer order number. The bar coding on the disks are read by a bar code reader and the customer order number is transferred to the web server which creates a shipping label and shipping documents. The disks are then packed into boxes and shipped to customers (step 66). Depending on the customer order, one of more viewers may be packed into the boxes as well.

I claim:

1. A method of manufacturing a plurality of viewing disks embodying left and right images positioned to provide a three-dimensional effect to at least a portion of said images when viewed using a three-dimensional viewing device, said method including:
   (a) loading a first image data file representing a scene into computer memory,
   (b) creating an additional layer in said first image data file containing a visual element,
   (c) duplicating said first image data file to create a second image data file,
   (d) adjusting the position of said additional layer in either or both of the first or second image data files to a predetermined relative position,
   (e) positioning the first and second image data files to create a digital reel file representing said left and right images,
   (f) copying and positioning the digital reel file to create a digital master print file comprising a plurality of copies of said digital reel file,
   (g) printing the digital master print file to create a transparency film comprising a plurality of visual images representing said viewing disks,
   (h) cutting the transparency film to create a plurality of said viewing disks, wherein said predetermined relative position is such that the viewing disk provides a three-dimensional effect of said visual element relative to the scene when the viewing disk is viewed using said three-dimensional viewing device.

2. The method of claim 1, wherein said visual element is text.

3. The method of claim 1, wherein said visual element is artwork.

4. The method of claim 1, wherein the left and right images represented in the digital reel file are substantially equidistant from a center point, and the method further comprises cutting the laminated structure to circular form, wherein the center of the circular form substantially coincides with said center point.

5. The method of claim 1, wherein:
step (b) comprises employing an image manipulation module to create said additional layer;
step (d) comprises employing an image manipulation module to adjust the positions of said additional layer;
step (e) comprises employing a graphics layout module to position the images represented by the first and second image data files; and
step (f) comprises employing a graphics layout module to copy and position the digital reel file to create a digital master print file.

6. The method of claim 1, further comprising an image manipulation module for adjusting the rotation and cropping of said first image data file.

7. The method of claim 1, in which said transparency film is laminated to at least one transparent sheet.

8. The method of claim 1, wherein step (b) further comprises:
using a graphics layout program to display the first and second modified image data files that were saved in the image manipulation program and a disk template defining multiple pairs of left and right windows and reference indicia associated with the left and right windows of each pair,
employing the graphics layout program to position the images represented by the first and second modified image data files in the left and right windows respectively of one of said multiple pairs of left and right windows, with the reference indicia attached to the left and right images aligned with the reference indicia associated with the left and right windows respectively, and
saving a composite data file, which represents the left and right images in the relative positions and orientations prescribed by alignment of the reference indicia attached to the first and second images with the reference indicia associated with the left and right windows respectively, as said stereo image data file.

9. A method of manufacturing viewing disks embodying left and right images positioned to provide a three-dimensional effect to at least a portion of said images when viewed using a three-dimensional viewing device, said method including:
(a) customer uploads a first image data file representing a base image to web site,
(b) customer selects visual element to be inserted into said base image which is saved in said first image data file as an additional layer,
(c) using a computer to duplicate said first image data file to create a second image data file,
(d) using a computer to adjust the position of said additional layer in either or both of the first or second image data files to a predetermined relative position,
(e) using a computer to position the first and second image data files to create a digital reel file representing said left and right images,
(f) directing the customer to enter purchase and shipping information,
(g) storing said purchase and shipping information into computer memory,
(h) using a computer to copy and position the digital reel file to create a digital master print file comprising a plurality of copies of said digital reel file,
(i) printing the digital master print file to create a transparency film comprising a plurality of visual images representing said viewing disks,
(j) laminating the transparency film to at least one transparent sheet to form a laminated structure,
(k) cutting the laminated structure to create a plurality of said viewing disks,
(l) preparing information to enable delivery to a customer,
wherein said predetermined relative position is such that the viewing disk provides a three-dimensional effect of said visual element relative to the scene when the viewing disk is viewed using said three-dimensional viewing device.

10. The method of claim 9, wherein said visual element is text.

11. The method of claim 9, wherein said visual element is artwork.

12. The method of claim 9, wherein the left and right images represented in the digital reel file are substantially equidistant from a center point, and the method further comprises cutting the laminated structure to circular form, wherein the center of the circular form substantially coincides with said center point.

13. The method of claim 9, wherein:
step (b) comprises employing an image manipulation module to create said additional layer;
step (d) comprises employing an image manipulation module to adjust the positions of said additional layer;
step (e) comprises employing a graphics layout module to position the images represented by the first and second image data files; and
step (f) comprises employing a graphics layout module to copy and position the digital reel file to create a digital master print file.

14. The method of claim 9, wherein step (b) further comprises:
using a graphics layout program to display the first and second modified image data files that were saved in the image manipulation program and a disk template defining multiple pairs of left and right windows and reference indicia associated with the left and right windows of each pair,
employing the graphics layout program to position the images represented by the first and second modified image data files in the left and right windows respectively of one of said multiple pairs of left and right windows, with the reference indicia attached to the left and right images aligned with the reference indicia associated with the left and right windows respectively, and
saving a composite data file, which represents the left and right images in the relative positions and orientations prescribed by alignment of the reference indicia attached to the first and second images with the reference indicia associated with the left and right windows respectively, as said stereo image data file.

15. The method of claim 9, further comprising an image manipulation module for adjusting the rotation and cropping of said first image data file.

16. The method of claim 9, further comprising the printing of a bar coding customer number on said viewing disks and using said bar coding customer number to prepare information to enable delivery to a customer.

* * * * *